United States Patent [19]
Katayama

[11] Patent Number: 5,689,328
[45] Date of Patent: Nov. 18, 1997

[54] OPTICAL TYPE RANGE FINDER APPARATUS FOR MOTOR VEHICLE

[75] Inventor: Koji Katayama, Tokyo, Japan

[73] Assignee: Mitsubishi Denki Kabushiki Kaisha, Tokyo, Japan

[21] Appl. No.: 618,198

[22] Filed: Mar. 19, 1996

[30] Foreign Application Priority Data

Oct. 9, 1995 [JP] Japan ................................. 7-261762

[51] Int. Cl.$^6$ ................................. G01C 3/08; G02B 7/00
[52] U.S. Cl. ................................. 356/4.01; 359/507
[58] Field of Search ................................. 356/3.02, 4.01; 359/507, 512, 820

[56] References Cited

U.S. PATENT DOCUMENTS

| | | | |
|---|---|---|---|
| 5,488,468 | 1/1996 | Kawanishi et al. | 356/4.01 |
| 5,500,728 | 3/1996 | Nishimoto | 356/3.03 |
| 5,589,930 | 12/1996 | Kurahashi et al. | 356/5.01 |

FOREIGN PATENT DOCUMENTS 5157830   6/1993   Japan.

*Primary Examiner*—Mark Hellner
*Attorney, Agent, or Firm*—Sughrue, Mion, Zinn, Macpeak & Seas, PLLC

[57] ABSTRACT

An optical type range finder apparatus for a motor vehicle. Dew condensation and deposition on an inner surface of an irradiation laser beam projecting window is prevented even in the environment where a front surface of the range finder is cooled down steeply, for ensuring a stable distance measuring performance. The apparatus projects outwardly an irradiation light beam (LE) from the motor vehicle and detects a distance between the motor vehicle and an object on the basis of known relation between the irradiation light beam (LE) and an echo light beam (LR) from the object existing in environment of the motor vehicle. An irradiation window (3a) includes a first light-transmissive panel (7) having a surface exposed to the exterior, a second light-transmissive panel (21) having a surface exposed to the interior of the range finder apparatus, and a heat insulation space (24) formed by an air layer confined between the first light-transmissive panel (7) and the second light-transmissive panel (21).

4 Claims, 4 Drawing Sheets

OPTICAL TYPE RANGE FINDER APPARATUS FOR MOTOR VEHICLE

BACKGROUND OF THE INVENTION

1. Field of the Invention

The present invention generally relates to an optical type range finder apparatus (also known as the optical or laser radar apparatus) for a motor vehicle for detecting or determining a distance between the motor vehicle and an object of concern by projecting an irradiating or scanning laser beam from a light emission source and receiving an echo light beam resulting from reflection of the irradiation laser beam at the object. More specifically, the invention is concerned with an improvement of a light-transmissive panel structure of the range finder apparatus for protecting the light-transmissive panel surface against deposition of dew due to condensation of moisture in order to ensure a stabilized distance detecting or range finding operation or performance of the range finder apparatus.

2. Description of Related Art

Heretofore, the optical type range finder apparatus designed for such purpose as mentioned above is known and employed usually for detecting or determining a distance between a motor vehicle equipped with the range finder apparatus and an object of concern which may exist in front of the motor vehicle as viewed in the traveling direction such as a car running ahead.

The basic concept underlying such optical type range finder apparatus can generally be seen in that a pulse laser beam is projected in the forward direction from the motor vehicle while deflecting it over a predetermined angular range and an echo resulting from reflection at an object such as a car running ahead, obstacle or the like is received as a reflected laser beam, whereon the distance between the motor vehicle equipped with the range finder apparatus and the object of concern is arithmetically determined on the basis of a relation between the projected laser beam and the echo and other parameters in accordance with a method which per se is known in the art.

In conjunction with the optical type range finder apparatus, it is noted that when the ambient temperature of the environment in which the motor vehicle equipped with the range finder is running becomes lower abruptly or steeply, dew condensation is very likely to take place on an inner surface of an irradiation or scanning light beam projecting window (i.e., light-transmissive panel), involving deposition of water drop or water film on the inner surface of a glass panel constituting a part of the window, as a result of which the quantity of light or intensity of the light beam is attenuated, incurring degradation in the range finding (distance measuring) capability or performance of the range finder apparatus. Accordingly, it is very important to prevent positively occurrence of dew condensation on the laser beam projecting part.

An approach for solving the problem mentioned above is proposed in Japanese Unexamined Patent Application Publication No. 157830/1993 (JP-A-5-157830) according to which a heating member is disposed on an inner surface of a front lens constituting a part of a light beam projecting optical system with a view to controlling the temperature thereof for preventing the range-finding performance or capability of the range finder apparatus from degradation due to dew deposition.

As another attempt tackling the problem mentioned above, it is also known to use a desiccant agent as a means for protecting the inner surface of the irradiation laser beam window against dew condensation by decreasing the moisture content of the air confined within the range finder to thereby lower the dew point.

However, the inter-car distance measuring optical range finder disclosed in Japanese Unexamined Patent Application Publication No. 157830/1993 (JP-A-5-157830) is disadvantageous in that the structure for providing the heating member in association with the inner surface of the front lens is not only much complicated but also very expensive. Further, the second mentioned approach of disposing the desiccant agent within the space at the inner side of the irradiation on scanning beam projecting window suffers a problem that limitation is necessarily imposed to the water-retaining power of the desiccant agent and thus can not satisfactorily ensure reliability over a long period.

SUMMARY OF THE INVENTION

In the light of the state of the art described above, it is an object of the present invention to provide an optical type range finder apparatus of a novel and improved structure in which dew condensation on an inner surface of an irradiation laser beam projecting window can positively be prevented even in the environment where the front surface of the apparatus is cooled down steeply, to thereby ensure a stable distance measuring performance of the range finder apparatus installed on a motor vehicle and an object of concern by enhancing the irradiation efficiency of the laser beam as projected.

In view of the above and other objects which will become apparent as the description proceeds, there is provided according to a general aspect of the present invention an optical type range finder apparatus for a motor vehicle, which apparatus includes a light emission source mounted on the motor vehicle for generating an irradiation light beam, an irradiation window for projecting from the motor vehicle to the exterior the irradiation light beam generated by the light emission source in response to a light beam sending signal, a reflection light beam receiving window for receiving an echo light beam resulting from reflection of the irradiation light beam at an object existing in an environment of the motor vehicle, an arithmetic processing means for detecting a distance from the motor vehicle to the object on the basis of a relation between the light beam sending signal and a light beam reception signal generated in response to reception of the reflection light beam. The irradiation window includes a first light-transmissive panel having a surface exposed to the exterior of the range finder apparatus, a second light-transmissive panel having a surface exposed to the interior of the range finder apparatus, and a heat insulation space which is formed by an air layer interposed between the first light-transmissive panel and the second light-transmissive panel.

In a preferred mode for carrying out the invention, the optical type range finder apparatus mentioned above may further include a metal frame for holding the first light-transmissive panel. The heat insulation space should preferably be shielded from the interior of the range finder apparatus and disposed in contact with an inner surface of the metal frame.

In another preferred mode for carrying out the invention, the second light-transmissive panel may be disposed with an inclination of a predetermined angle relative to a plane extending perpendicularly to the optical axis of the irradiation light beam.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
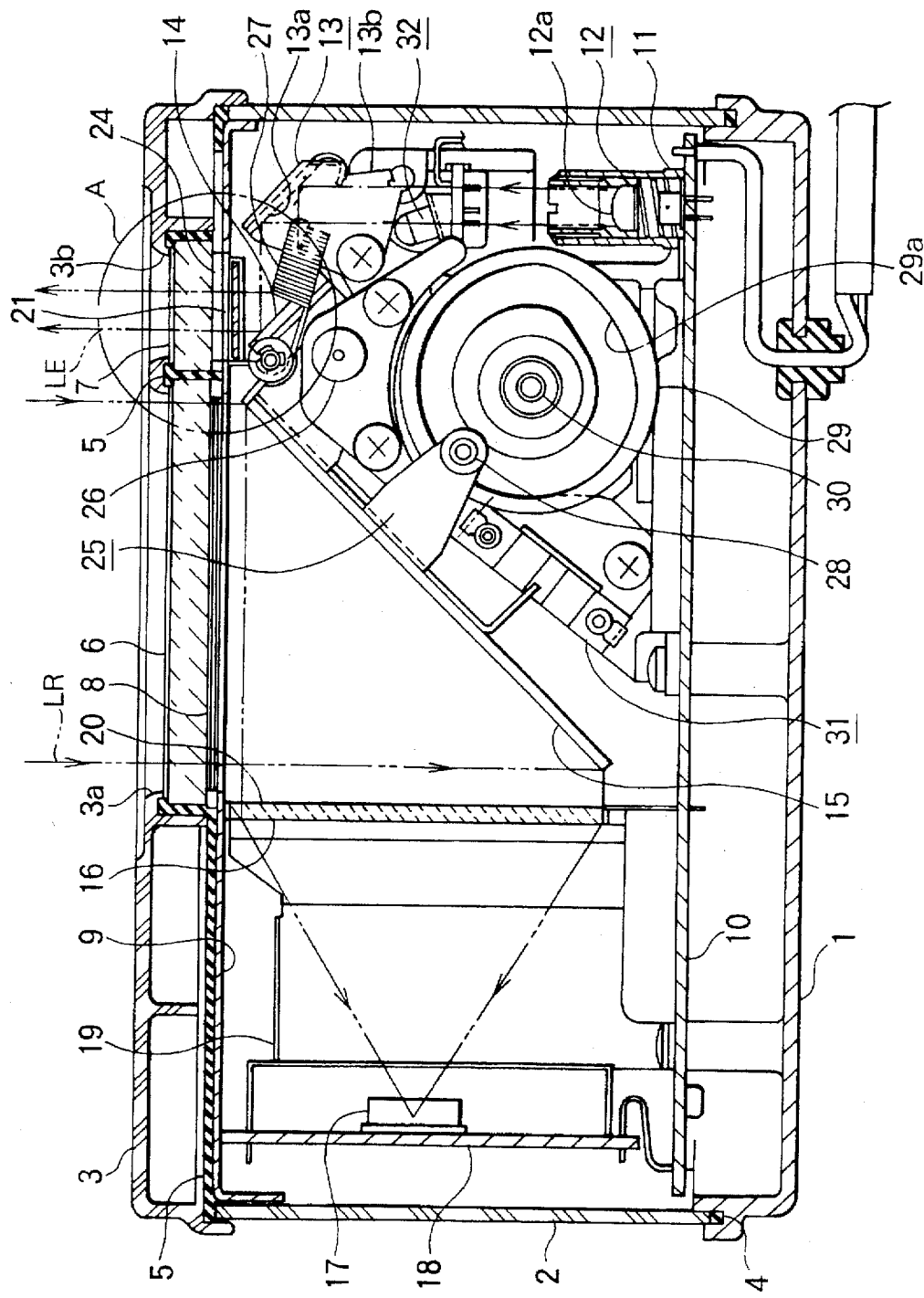
FIG. 1 is a vertical sectional view showing an optical type range finder apparatus for a motor vehicle according to a first embodiment of the present invention.

Now, the present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "left", "right", "front", "rear", "forwardly" and the like are words of convenience and are not to be construed as limiting terms.

EMBODIMENT 1

Figure 2:
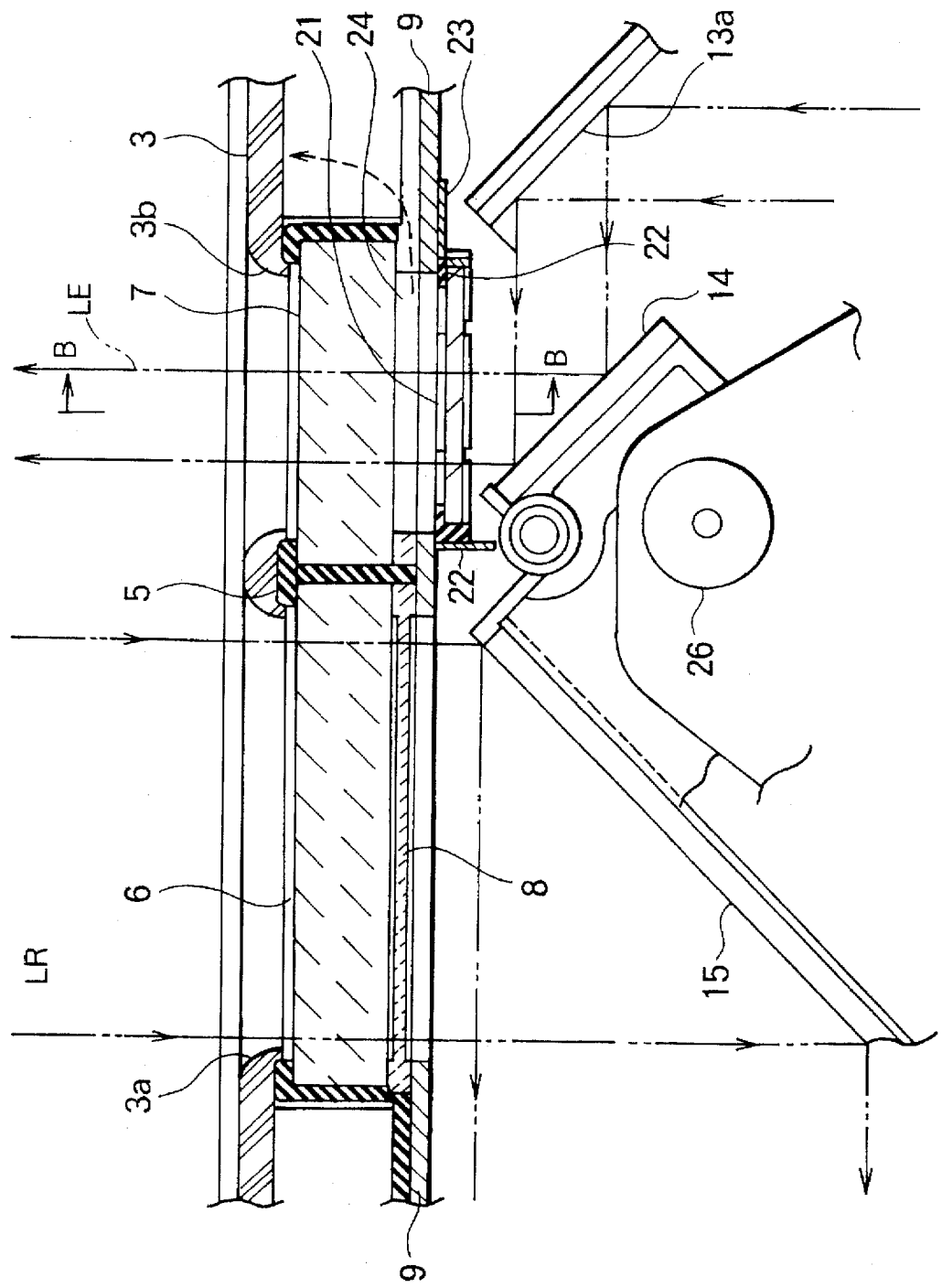
FIG. 2 is an enlarged sectional view of a portion of the range finder apparatus indicated as encircled at A in FIG. 1, showing in detail a structure of the same.
Figure 3:
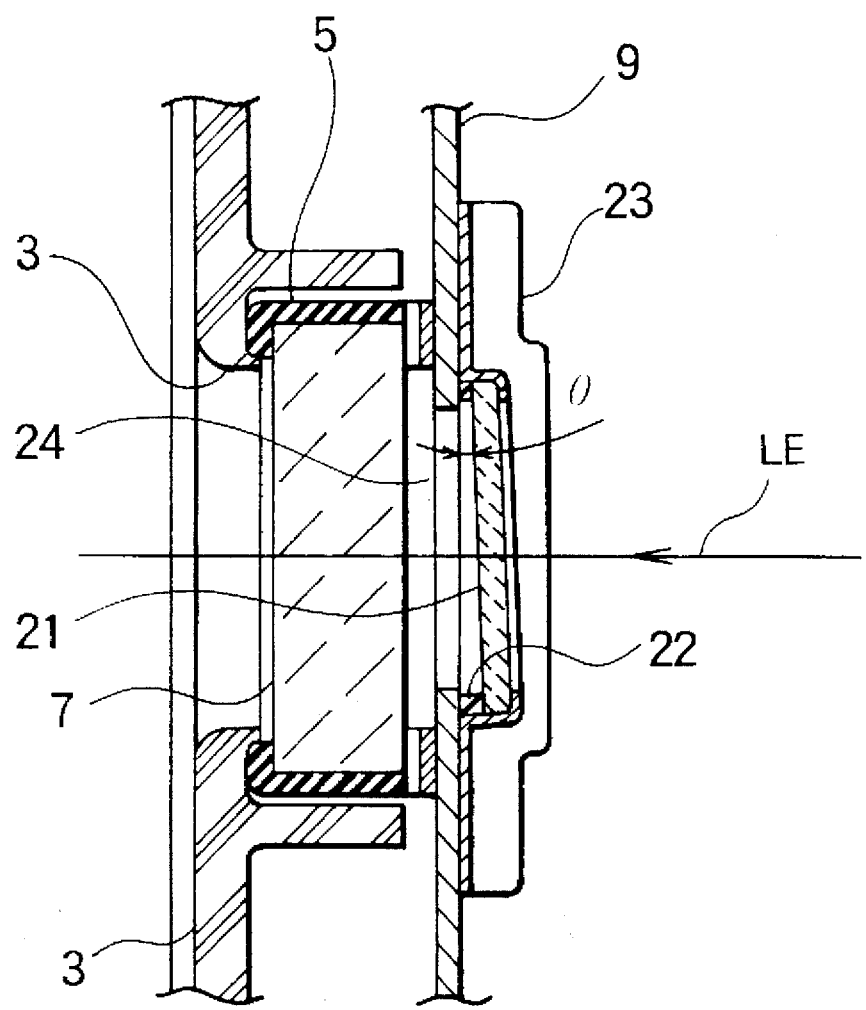
FIG. 3 is a sectional view of the range finder apparatus taken along a line B—B shown in FIG. 2.
Figure 4:
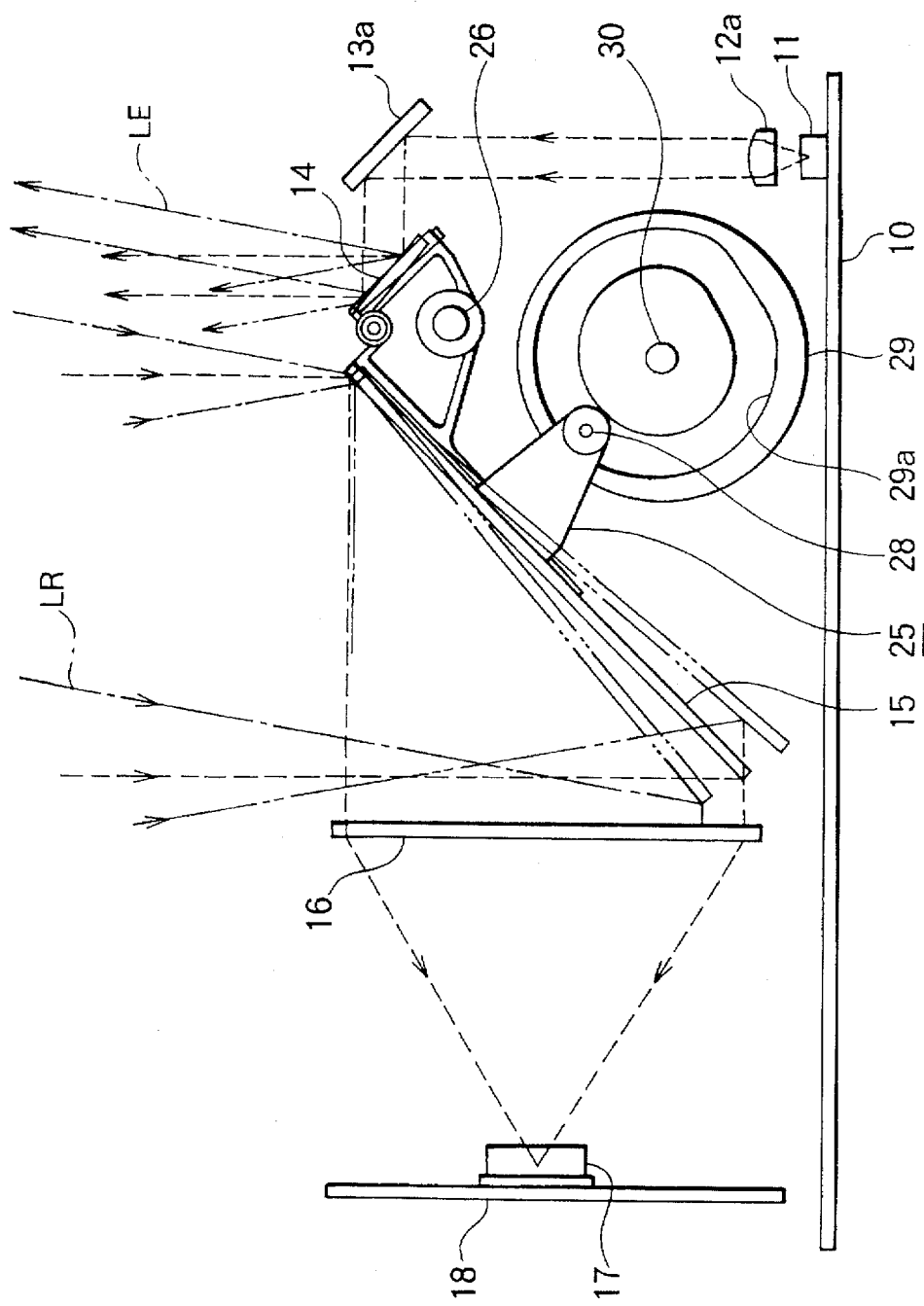
FIG. 4 is a schematic view for illustrating operation of a major portion of the optical type range finder apparatus shown in FIG. 1.

Now, an optical type range finder apparatus according to a first embodiment of the present invention will be described by reference to the drawings in which FIG. 1 is a sectional view showing the optical type range finder apparatus, FIG. 2 is an enlarged sectional view of a portion of the optical type range finder apparatus enclosed by a circle A in FIG. 1, FIG. 3 is a sectional view of the apparatus taken along a line B—B in FIG. 2, and FIG. 4 is a schematic diagram for illustrating operation of the range finder apparatus shown in FIG. 1.

Referring to FIG. 1, the optical type range finder apparatus installed on a motor vehicle includes a rear cover 1 formed of a resin to which a casing 2 formed of aluminum or the like is attached with a packing 4 interposed between the rear cover 1 and the casing 2. On the other hand, a front cover 3 made of aluminum is mounted on the casing 2 with a packing 5 being interposed therebetween. The rear cover 1, the casing 2, the front cover 3 and the packings 4 and 5 cooperate to constitute a housing of the optical type range finder apparatus in a hermetically closed structure.

Formed in the front cover 3 is an opening or window 3a which includes a light-incident glass plate 6 at a position for receiving an echo or reflected laser beam LR reflected back from an object of concern such a car running ahead or the like so as to allow the reflected laser beam LR to be transmitted through the light-incident glass plate 6. Additionally, the front cover 3 is provided with another window 3b having a first exit glass plate 7 fit therein which constitutes a first light-transmissive panel for allowing an irradiation or scanning laser beam LE to exit from the range finder apparatus. The first exit glass plate 7 is disposed in direct contact with the open air or ambient atmosphere.

Mounted on the inner surface of the light-incident glass plate 6 is a filter 8 for blocking passage of visible light rays so that only the reflected laser beam LR from the object of concern can pass through the filter 8 and enter the range finder apparatus. The light-incident glass plate 6, the first exit glass plate (first light-transmissive panel) 7 and the filter 8 are disposed under pressure against the inner surface of the front cover 3 by means of a plate 9 mounted on the inner surface of the housing of the range finder apparatus so as to be fixedly secured to one another. As this juncture, it should however be noted that a small air gap is defined between the inner surface of the light-incident glass plate 6 and the filter 8 with a view to preventing generation of Newton's rings (refer to FIG. 2).

Additionally, mounted at the inner side of the first exit glass plate 7 and the plate 9 is a second exit glass plate 21 constituting a second light-transmissive panel for allowing the irradiation or scanning laser beam LE to exit the range finder apparatus, as shown in FIG. 2. The second exit glass plate (second light-transmissive panel) 21 is isolated from the open air and placed in contact with the inside air of the range finder apparatus, wherein the second exit glass plate (second light-transmissive panel) 21 is held under pressure in opposition to the inner surface of the first exit glass plate 7 by means of a spacer 22 with a spacer 22 being interposed between the casing 27 and the plate 23. By virtue of this structure, there is formed or defined between the first exit glass plate 7 and the second exit glass plate 21 a heat insulation space 24 formed by an air layer. In this conjunction, it should be noted that the heat insulation space 24 has an extremely small volume when compared with that of the range finder apparatus, as a whole.

More specifically, the heat insulation space 24 is enclosed by the first and second exit glass plates 7 and 21, the plate 9, the spacer 22, the packing 5 and the filter 8 and a portion of the front cover 3 and is shielded from the air resident within the inner space of the range finder apparatus. On the other hand, the heat insulation space 24 is communicated to the front cover 3, as indicated by a broken-line arrow in FIG. 2, and placed in contact with the inner surface of the front cover 3 made of a metallic material. The front cover 3 serves as a metallic frame member for holding not only the light-incident glass plate (i.e., echo light beam receiving plate) 6 but also the first and second exit glass plates 7 and 21.

Referring to FIG. 1, a main substrate 10 mounted on the rear cover 1 is packaged with an electronic control circuit device (not shown). Furthermore, a light-emitting device 11 for emitting pulsewise the irradiation laser beam LE at a predetermined time interval is mounted on the main substrate 10. Additionally mounted on the main substrate 10 is a lens assembly 12 which includes a lens 12a for adjusting a beam spreading angle of the irradiation laser beam LE emitted from the light-emitting device 11 to a predetermined value.

A fixed mirror assembly 13 disposed fixedly in opposition to the lens assembly 12 includes a mirror 13a serving as a light beam reflecting means which is disposed at the inner surface of a mounting plate 13b bent in an L-like configuration. Owing to this arrangement, the fixed mirror assembly 13 is positioned in an optical path of the irradiation laser beam LE emitted from the light-emitting device 11, wherein the irradiation laser beam LE is reflected at the mirror 13a to change the travelling direction thereof.

As can clearly be seen in FIG. 2, a sender mirror 14 disposed in opposition to the fixed mirror assembly 13 is positioned at the inner side of the first and second exit glass plates 7 and 21 for reflecting the irradiation laser beam LE whose travelling or propagating direction is changed by the mirror 13a, whereby the irradiation laser beam LE is sent out frontwardly from the optical type range finder apparatus and hence the motor vehicle through the second exit glass plate 21 and the first exit glass plate 7. Parenthetically, it should be noted that the second exit glass plate 21 is disposed with a predetermined angle θ of inclination (ranging from 0.5° to several degrees) relative to a plane extending perpendicularly to the optical axis of the irradiation laser beam LE, as shown in FIG. 3.

Disposed at the inner side of the light-incident glass plate 6 is a light receiving mirror 15 which reflects the echo laser beam LR from the object of concern located in front, to thereby change the traveling direction of the echo laser beam LR incident on and through the light-incident glass plate 6. On the other hand, a light receiving lens 16 disposed in opposition to the light receiving mirror 15 serves to focus the received echo laser beam LR undergone reflection at the receiving mirror 15 onto a light receiving element 17 disposed downstream thereof.

The light receiving element 17 is packaged in a light receiving substrate 18 disposed within the casing 2 at a position corresponding to a focal point of the light receiving lens 16. A casing 19 mounted on the light receiving substrate 18 in such disposition as to cover the light receiving element 17 serves to shield the light receiving element 17 against spurious electromagnetic wave noise. A plate 20 mounted at one end surface of the casing 19 holds fixedly the light receiving lens 16 so as to position it properly relative to one end surface of the casing 19. In this manner, a predetermined distance can be assured between the light receiving lens 16 and the light receiving element 17 by means of the casing 19.

The echo light beam receiving mirror 15 and the light beam sender mirror 14 are fixedly secured to a swingable bracket-like member 25 which is mounted swingably on a supporting member 26 and resiliently urged in one direction under the action of a spring 27, wherein the swingable member 25 is adapted to swing or revolve for a predetermined angle through cooperation of a cam 29 having a cam surface 29a and a follower 28. On the other hand, the cam 29 is adapted to be rotated by an electric motor 30 at a predetermined periodical interval.

Mounted on the main substrate 10 is a position sensor 31 which serves for detecting the position of the swingable member 25 to thereby determine a reference for the direction in which the irradiation laser beam LE is projected for the scanning. Further, mounted is a dirt detecting sensor 32 for detecting dirt or dust deposition on the surface of the first exit glass plate 7.

Next, referring to FIG. 4, description will be directed to operation of the optical type range finder or laser radar apparatus implemented in the structure described in FIGS. 1 to 3.

The light-emitting device 11 emits the irradiation laser beam LE in response to a light emission control signal outputted from an electronic control device packaged in the main substrate 10.

The irradiation laser beam LE is then focused into a beam having a diameter lying within a predetermined range by means of the lens 12a. The irradiation laser beam LE passed through the lens 12a is then reflected by the mirror 13a and the sender mirror 14 so as to follow an optical path indicated by a broken line in FIG. 4, to be thereby projected, for example, in the forward or running direction of the motor vehicle.

When the irradiation laser beam LE is reflected at an object of concern existing at the front of the motor vehicle such as a car running ahead or the like, a reflected laser beam LR which may also be referred to as the echo beam is sent backward to the motor vehicle along an optical path indicated by a broken line in FIG. 4. The reflected laser beam LR impinges into the range finder apparatus through the light-incident glass plate 6 to be thereby received by the light receiving element 17 through the collecting lens 16 after having been reflected at the mirror 15.

Upon reception of a laser beam reception signal outputted from the light receiving element 17, an arithmetic processing circuit (not shown) incorporated in the light receiving substrate 18 executes an arithmetic processing on the basis of a relation between the laser beam reception signal and the laser beam send signal for thereby determining the distance between the motor vehicle and the object of concern.

On the other hand, the position sensor 31 detects the swinging movement of the swingable member 25 for detecting the reference position thereof to output a corresponding signal to the electromagnetic control device packaged in the main substrate 10. The electronic control device then determines the direction in which the irradiation laser beam LE reflected by the sender mirror 14 was projected on the basis of the relation between the detection signal outputted from the position sensor 31 and the driving signal for the electric motor 30.

More specifically, the irradiation or scanning laser beam LE is projected, as being reciprocatively deflected between directions indicated by a single-dotted broken line and a double-dotted broken line, respectively, shown in FIG. 4 during a single rotation of the cam 29. In other words, the irradiation or scanning laser beam LE is projected in the direction falling within a range defined between the single-dotted broken line and the double-dotted broken line, while the echo laser beam LR reflected at the object of concern is sent back to the motor vehicle in the direction within the range defined between the single-dotted broken line and the double-dotted broken line.

In that case, because the light receiving mirror 15 is caused to swing in synchronism with the sender mirror 14, the echo laser beam LR is reflected by the light receiving mirror 15 to impinge onto the light receiving lens 16 substantially orthogonally to the plane thereof. Thus, the echo laser beam LR from the object of concern is collected with high efficiency substantially at the focal point of the light receiving lens 16, which in turn ensures stable generation of the output signal by the light receiving photoelectric element 17. In this manner, the distance intervening the motor vehicle and the object of concern moving or existing in front of the motor vehicle as well as the direction of the former can be detected with an enhanced accuracy.

Next, description will turn to operation or action of the optical type range finder apparatus for preventing occurrence of dew condensation when the motor vehicle is running in such situation that the front side or panel of the apparatus is subjected to rapid cooling action of the ambient atmosphere. By way of example, when the front cover 3 which is in direct contact with the outside air is cooled stringently, the metallic frame portion of a relatively low heat or thermal capacity forming a part of the front cover 3 is first cooled down.

In this conjunction, it is to be noted that the air which is confined within the heat insulation space 24 formed between the first exit glass plate (first light-transmissive panel) 7 and the second exit glass plate (second light-transmissive panel) 21 and which may contain moisture is in direct contact with the metallic frame of the front cover 3. Consequently, when moisture contained in the air confined within the heat insulation space 24 is condensed, dew condensation will take place on the metallic frame portion of the front cover 3 made of aluminum which has a lower thermal or heat capacity than the first exit glass plate 7 before the inner side surface of the first exist glass 7 is cooled. As a result of this, dew concentration on the inner surface of the first exit glass plate 7 can be prevented.

Additionally, it should be mentioned that a relatively long time is taken for the second exit glass plate (second light-transmissive panel) 21 to be cooled, because of interposition of the air layer confined within the heat insulation space 24 and serving as the heat insulating layer between the first exit glass plate 7 and the second exit glass plate 21. For this reason, during a period in which the second exit glass plate 21 is cooled, the metallic casing 2 and the front cover 3 are cooled sufficiently for cooling down the interior of the optical type range finder apparatus.

As will be understood from the foregoing description, when the moisture contained in the air within the optical type range finder apparatus is condensed, dew formation will first occur at the inner surface of the metallic casing 2 made of a metal. Thus, dew condensation on the inner surface of the second exit glass plate (second light-transmissive panel) 21 can positively be prevented.

To say in another way, because the dew condensation on the first and second exit glass plates 7 and 21 can be prevented, irradiation or projection efficiency of the scanning laser beam LE can positively prevented from degradation due to dew condensation.

Parenthetically, in conjunction with the dew condensation on the light-incident glass plate 6 onto which the echo laser beam LR impinges, it is noted that the dew condensation scarcely exerts any appreciable adverse influence to the light receiving performance, presenting any especial problem. It is necessary only that the intensity of the irradiation laser beam LE can be assured.

Incidentally, the irradiation laser beam LE undergoes reflection at the sender mirror 14 as well as at the second exit glass plate 21 more or less upon passing therethrough. Consequently, a part of light energy is reflected both to the light-emitting device 11 to thereby exert influence to the irradiation laser beam LE due to further reflection. In this conjunction, it is however noted that because the second exit glass plate 21 has a predetermined angle θ of inclination, as shown in FIG. 3, the light beam reflected at the second exit glass plate 21 travels in a direction which is deviated from the optical axis of the irradiation laser beam LE.

Thus, even when the light beam sent back to the light-emitting device 11 should again be reflected at the light-emitting device 11 and irradiated forwardly, the light beam will travel in the directions deviated significantly from the optical path of the normal irradiation laser beam LE to be outside of the light detection range of the light receiving element 17. Thus, erroneous detection of an object of concern by the range finder apparatus can positively be prevented.

By virtue of the structure described above, even in such a situation that the front panel of the optical type range finder apparatus for the motor vehicle is cooled down steeply, the surface of the second transparent panel (i.e., the second exit glass plate 21) which is in contact with the air at the inside of the first light-transmissive or transparent panel (i.e., the first exit glass plat 7 of the window 3b) constituting the exit window for the irradiation laser beam LE is cooled with a significant time delay relative to the metallic portion of the first light-transmissive panel holding frame (i.e., the front cover 3) owing to the action of the heat insulation space 24 interposed between the first and second transparent panels.

Thus, the dew condensation at the inner surface (i.e., the first exit glass plate 7 and the second exit glass plate 21) of the irradiating or projecting window for the irradiation laser beam LE can satisfactorily be prevented, whereby high efficiency of the scanning irradiation laser beam LE can be ensured. Thus, there can be realized the optical type range finder apparatus for a motor vehicle which can enjoy stabilized distance measuring or range-finding performance. Furthermore, because a part of the heat insulation space 24 is in contact with the inner surface of the metallic front cover 3 so that the dew condensation takes place at first on the inner surface of the front cover 3, the dew condensation on the inner surface of the first exit glass plate 7 can be prevented without fail.

Furthermore, because second transparent or light-transmissive panel (i.e., the second exit glass plate 21) is disposed with the predetermined angle (θ) of inclination relative to the plane orthogonal to the optical axis of the irradiation laser beam LE, reflection of the echo beam which may occur only little on the surface of the second light-transmissive panel (i.e., the second exit glass plate 21) can be directed to the outside of the range for receiving the echo light beam. In this way, erroneous distance detecting operation of the optical type range finder apparatus for the motor vehicle can essentially be excluded, whereby the range finder apparatus enjoying stable operation can be realized while excluding false or erroneous detection.

MODIFICATIONS

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, although a part of the heat insulation space 24 is so arranged as to contact the metallic front cover 3, such arrangement may equally be adopted in which the heat insulation space 24 is communicated to the inner surface of the front cover 3 so long as the dew condensation suppressing effect can be realized sufficiently only by providing the heat insulation space 24. Furthermore, although the second exit glass plate 21 is mounted with the angle θ of inclination, as shown in FIG. 3, such inclination angle θ need not be set so long as the amount of light reflected at the exit window portion from which the irradiation laser beam LE is projected can be neglected.

Furthermore, although the invention has been described in conjunction with the optical type range finding apparatus for determining a distance between a motor vehicle equipped with the optical range finder and an object of concern such as a car running ahead, it will readily be understood for those skilled in the art that the teaching of the invention can equally find application to an optical apparatus for detecting the presence itself of such an object.

Accordingly, all suitable modifications and equivalents may be resorted to, falling within the spirit and scope of the invention.

What is claimed is:

1. An optical type range finder apparatus for a motor vehicle, comprising:

a light emission source mounted on said motor vehicle;

an irradiation window for projecting outwardly from said motor vehicle an irradiation light beam generated by said light emission source in response to a light beam sending signal;

a reflected light beam receiving window for receiving an echo light beam resulting from reflection of said irradiation light beam at an object existing in environment of said motor vehicle;

arithmetic processing means for detecting a distance from said motor vehicle to said object on the basis of a relation between said light beam sending signal and a light beam reception signal generated in response to reception of said reflection light beam;

wherein said irradiation window includes:
- a first light-transmissive panel having a surface exposed to the exterior of said optical type range finder apparatus;
- a second light-transmissive panel having a surface exposed to the interior of said optical type range finder apparatus; and
- a heat insulation space formed by an air layer confined between said first light-transmissive panel and said second light-transmissive panel.

2. An optical type range finder apparatus for a motor vehicle according to claim 1, further comprising:

a metal frame for holding said first light-transmissive panel;

wherein said heat insulation space is shielded from the interior of said optical type range finder apparatus and disposed in contact with an inner surface of said metal frame.

3. An optical type range finder apparatus for a motor vehicle, according to claim 1, wherein said second light-transmissive panel is disposed with inclination of a predetermined angle relative to a plane extending perpendicular to the optical axis of said irradiation light beam.

4. An optical type radar apparatus for a motor vehicle, comprising:

a light emission source mounted on said motor vehicle;

an irradiation window for projecting outwardly from said motor vehicle an irradiation light beam generated by said light emission source in response to a light beam sending signal;

a reflected light beam receiving window for receiving an echo light beam resulting from reflection of said irradiation light beam at an object existing in environment of said motor vehicle;

arithmetic processing means for detecting presence of said object on the basis of a relation between said light beam sending signal and a light beam reception signal generated in response to reception of said reflection light beam;

wherein said irradiation window includes:
- a first light-transmissive panel having a surface exposed to the exterior of said optical type range finder apparatus;
- a second light-transmissive panel having a surface exposed to the interior of said optical type range finder apparatus; and
- a heat insulation space formed by an air layer confined between said first light-transmissive panel and said second light-transmissive panel.

* * * * *